Dec. 25, 1928.  H. M. PFLAGER  1,696,324

BOOSTER MOTOR SUSPENSION

Filed July 22, 1924   2 Sheets-Sheet 1

Inventor
Harry M. Pflager
By Rodney Bedell Atty.

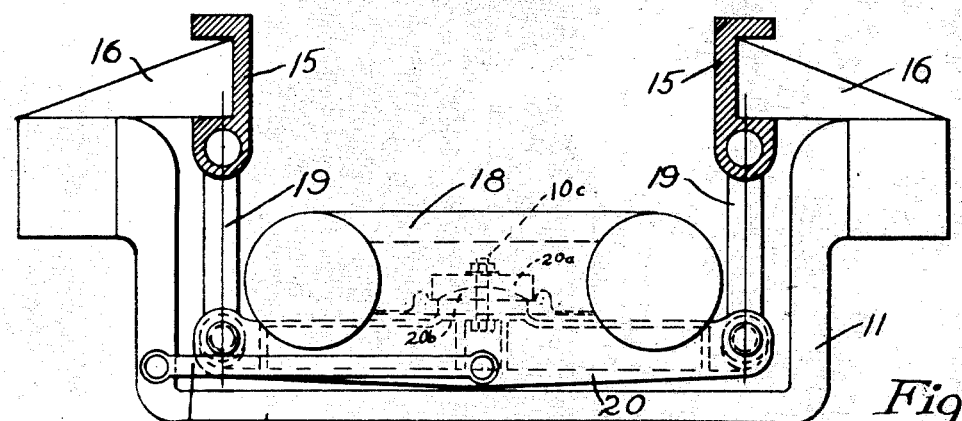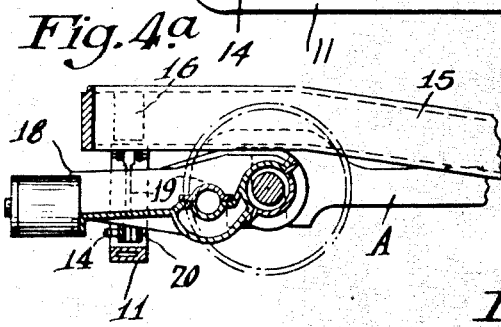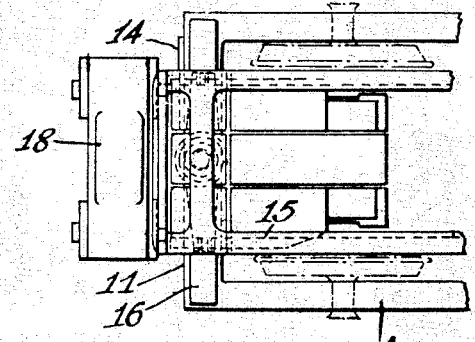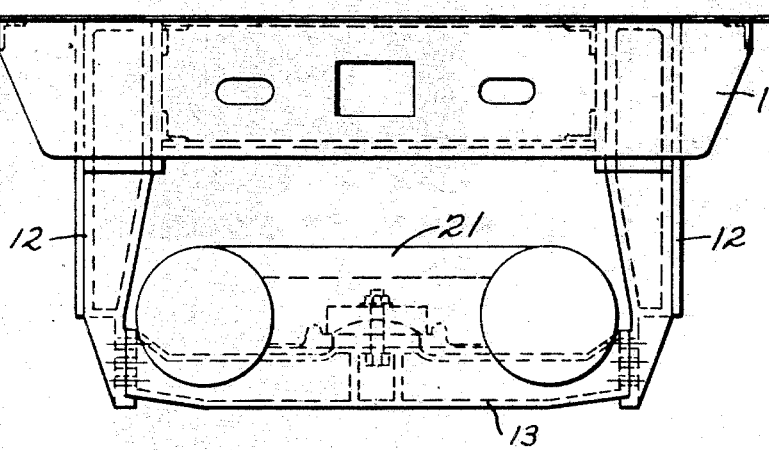

Patented Dec. 25, 1928.

1,696,324

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

BOOSTER-MOTOR SUSPENSION.

Application filed July 22, 1924. Serial No. 727,505.

My invention relates to railway rolling stock and consists in an improved mounting of booster motors in locomotives.

My invention is applicable to that type of locomotive having a trailer axle and wheels and including a booster motor operatively connected thereto and partially supported thereby.

The main object of my invention is to partially support the booster motor from the main frame of the locomotive, thereby eliminating the necessity of a trailer truck, or, if such a truck is used, relieving the trailer truck frame of the weight of the booster motor and making it possible to lighten the trailer truck frame.

Particular objects of my invention are to provide pivotal means for suspending the motor from the locomotive frame, to provide a universal joint support for the end of the booster motor spaced from the trailer axle, and, where a trailer truck is used, to connect the booster motor with the truck frame at a point spaced from the axle so as to swing the motor with the truck frame and axle irrespective of the support from the locomotive frame. I desire that the motor be rigidly supported from end to end irrespective of the variations in the relative position of its supporting elements and irrespective of any movement of the motor transversely of the locomotive frame.

This application is in part a continuation of my copending application Serial No. 559,658, filed May 9, 1922.

In the drawings illustrating my invention—

Figure 4 illustrates a modified structure and shows a booster motor and trailer truck in rear elevation, the motor being partially supported from the locomotive main frame which is sectioned.

Figure 1:
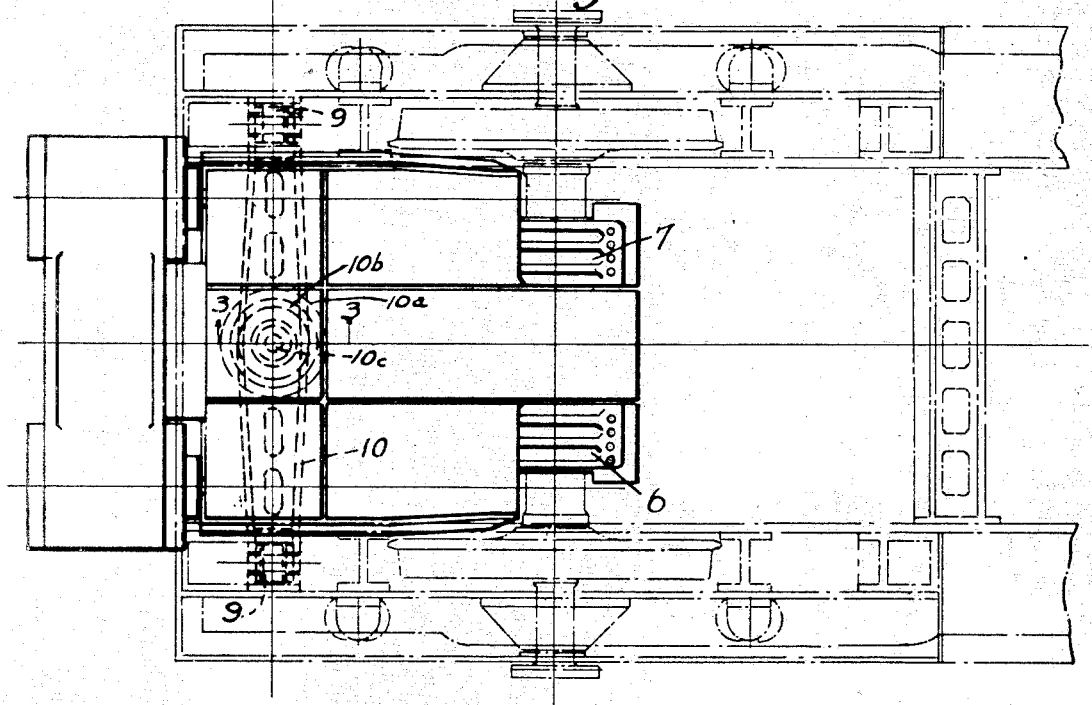
Figure 1 is a top view of the rear end of a locomotive frame provided with a trailer axle and wheels and a booster motor which is carried by the trailer axle and by the locomotive frame.

Figure 4ª is a vertical longitudinal section through the structure shown in Figure 4.

Figure 4ᵇ is a top view of the structure shown in Figure 4.

Figure 5 is a rear elevation of a locomotive frame and booster motor and illustrates another modification of my invention.

The rear portion or cradle of the main frame of the locomotive is indicated at 1 and it will be understood that the forward portion of this frame constitutes no part of the present invention and that this forward portion is mounted upon the main trucks of the locomotive in the usual manner. The frame is recessed at 2 to receive the journal boxes of a trailer axle 3 mounted by wheels 4. The main frame 1 is partially supported by the trailer axle through springs 1ª supported upon the trailer axle journal boxes and extends rearwardly beyond the same to a point substantially spaced from the trailer axle 3.

A booster motor including a frame 5 is provided with spaced bearings 6 and 7 upon trailer axle 3, which bearings permit the motor frame to swing, in a vertical plane, relative to the trailer axle and cause the booster motor to swing with the axle in a horizontal plane.

The rear of the locomotive frame is provided with hangers 8 from which links 9 are pivotally suspended at opposite sides of the frame of the locomotive and of the motor frame. The lower ends of links 9 suspend a cross bar 10 which is provided with a universal joint bearing for the booster motor frame comprising concavo-convex plates 10ª and 10ᵇ. A bolt 10ᶜ passes through beam 10, plates 10ª and 10ᵇ, and motor frame 5 and yieldingly holds these parts in the position shown although the provision of spring 10ᵈ and the enlarged bore through plates 10ª and 10ᵇ and frame 5 permits limited relative pivotal movement between the frame and the beam.

It will be obvious that the swinging support of the rear portion of the booster motor and the universal joint bearing for the booster motor on the supporting beam 10 accommodates relative movement between the trailer axle and booster motor and the main frame of the locomotive, such as will be produced by variations in the inclination of the axis of axle 3 and the longitudinal axis of the locomotive frame.

In Figures 4, 4ª and 4ᵇ the locomotive main frame is indicated at 15 and includes brackets 16 which support the rear end of the main frame upon a trailer truck frame A having a rear cross member 11. The booster motor 18 is suspended from the main frame by links 19 which pivotally support cross-bar 20 provided with a convex bearing element 20ᵇ fitting a corresponding element 20ª in the motor frame.

In order to take the strain of the shifting movement of the booster motor from the bearings on the trailer axle, I connect the rear cross member 11 of the trailer truck with the booster motor frame by means of a horizontal link 14 pivoted at opposite ends to motor supporting bar 20, and to the trailer truck frame, respectively, and serving to push or pull the booster motor frame transversely of the locomotive frame according to the relative movement of the trailer truck frame.

My preferred construction contemplates the use of a cast steel locomotive frame, a cast steel trailer truck frame, and a cast steel booster motor frame, thereby insuring maximum rigidity of these frames and the most efficient distribution of the metal for the work to be done.

The construction described removes the weight of the booster engine entirely from the trailer truck frame, distributing it to the trailer axle and the locomotive frame. This enables the use of a much lighter trailer truck frame than would be otherwise required.

Figure 2:
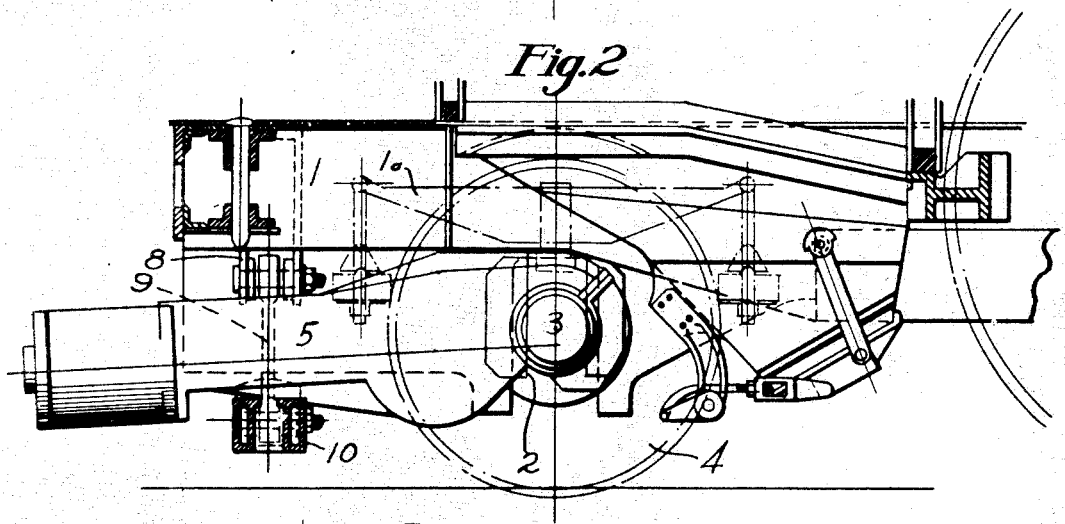
Figure 2 is in part a side elevation and in part a vertical longitudinal section of the equipment illustrated in Figure 1.
Figure 3:
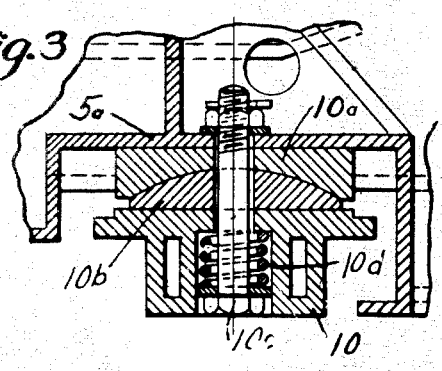
Figure 3 is a vertical section taken on line 3—3 of Figure 1.

Various other arrangements of the booster motor mounting may be provided, without departing from the broad idea embodied in the above described constructions, and in Figure 5 I illustrate a modified structure adapted to be used in that type of locomotive having a rigid or non-radial trailer axle in which it is only necessary to provide for movement of the booster motor to accommodate relative vertical movement of the trailer axle and the locomotive frame or movement of the opposite ends of the trailer axle relative to the locomotive frame which tends to produce twisting of the booster motor, either in horizontal or vertical planes. In this construction the rear end 17 of the locomotive frame is provided with rigid downwardly extending projections 12 adapted to support a cross member 13, corresponding to the pivotally supported cross members 10 and 20 of Figures 2 and 4, which supports the booster motor 21 through a universal joint corresponding to that shown in the other figures.

Other modifications of my invention will appear to those experienced in the art and I contemplate all such as fall within the scope of the following claims.

I claim:

1. In a locomotive, a main frame, a trailer axle partially supporting said frame, a booster motor for the trailer axle, a transverse beam beneath said booster motor carried by said main frame, and a single point of support for said motor on said beam.

2. In a locomotive, a main frame, a trailer truck partially supporting said main frame and including an axle, a booster motor, and a three-point suspension for said booster motor, at least one point of suspension being carried by said frame.

3. In a locomotive, a main frame, a trailer truck partially supporting said main frame and including an axle, a booster motor, and a three-point suspension for said booster motor, at least one point of suspension being pivotally carried by said frame.

4. In a locomotive, a main frame, a trailer truck partially supporting said main frame and including an axle, a booster motor supported at spaced points by said axle and pivotally supported at a single point by said frame.

5. In a locomotive, a main frame, a trailer truck including a wheeled axle, a horizontal member suspended from said main frame by parallel links, and a booster motor carried by said axle and member.

6. In a locomotive, a main frame, a trailer truck adapted to support a portion of said main frame and to swing vertically thereto, a booster motor frame carried at spaced points by said truck and said main frame, and means for swinging said motor frame on its main frame support with its trailer truck support.

7. In a locomotive, a main frame, a truck having an axle, a booster motor frame provided with a bearing on said axle, links pivotally suspending said motor frame from said main frame, and a link connecting said motor frame with said truck.

8. In a locomotive, a main frame, a trailer truck including a wheeled axle, depending elements at the sides of said main frame at the rear of said axle, a horizontal member carried by said elements, and a booster motor mounted on said axle and said member.

9. In a locomotive, a main frame, a trailer truck including an axle and wheels, and a booster motor pivotally supported at one end on the locomotive main frame and at its opposite end pivotally supported on the truck axle.

10. In a locomotive, a main frame, a trailer truck including an axle and wheels, a booster motor partially supported on said axle, and link suspension means pivoted to said frame and motor and partially supporting the latter.

11. In a locomotive, a main frame, a trailer truck, and a booster motor mounted on said truck to swing in a vertical plane and mounted on said main frame to swing in a horizontal plane, its mounting including means for yieldingly resisting swinging movements of said motor from a predetermined normal position.

12. In a locomotive, the combination, with the main frame, and a trailing truck, of an auxiliary engine frame for the trailing truck; a transverse beam beneath said auxiliary engine frame; and means supporting said beam from the main frame.

13. In a locomotive, the combination, with the main frame, and a trailing truck, of an auxiliary engine frame for the trailing truck; a transverse beam beneath said auxiliary engine frame; and suspension means at opposite ends of said beam, pivotally attached to the main frame.

14. In a locomotive, the combination, with the main frame, and a trailing truck, of an auxiliary engine frame for the trailing truck; a transverse beam beneath said auxiliary engine frame; and swinging links at the opposite ends of said beam for supporting the same from the main frame.

15. The combination with a booster motor for locomotives, of a truck having an axle and wheels, and means on the truck for maintaining the booster motor in alignment with the axle but permitting vertical movement of the booster motor.

16. The combination with a booster motor for locomotives, of a truck having an axle and wheels, and means on the truck for maintaining the booster motor in alignment with the axle in curving but permitting vertical rocking of the booster motor.

17. In a locomotive, the combination of a truck having an axle and wheels, a booster motor for driving said wheels, means for suspending the motor from the locomotive, and means on the truck for maintaining the motor in alignment with the axle but permitting vertical movement of the motor.

18. The combination with a locomotive, of a booster device including means whereby the device may be pivoted to the locomotive, an axle having wheels, a booster motor carried on the axle, means whereby the booster motor is maintained in alignment with the axle, and means for also supporting the booster from the locomotive.

19. The combination with a locomotive, of a booster device including a member whereby the device may be pivoted to the locomotive, an axle having wheels, a booster motor member, and a member for maintaining the motor in alignment with the axle, one of said members being articulated with another thereof.

20. The combination with a locomotive, of a booster device including a member whereby the device may be pivoted to the locomotive, an axle having wheels, a booster motor member, and a member for maintaining the motor in alignment with the axle, one of said members being articulated with another thereof, together with means whereby the booster motor is also supported from the locomotive.

21. The combination with a locomotive, of a booster device including a member whereby the device may be pivoted to the locomotive, an axle having wheels, a booster motor member, and a member for maintaining the motor in alignment with the axle, one of said members being articulated with another thereof, and a link suspension for supporting the booster motor from the locomotive.

22. In a locomotive, a main frame, a trailer truck partially supporting said main frame and including an axle, a booster motor supported by said axle and by said frame, a frame support including a pivotal suspension of the motor which permits the front end of the motor to move up and down freely with the axle and permits both ends of the motor to move transversely of said frame.

23. In a locomotive, a main frame, a truck having an axle, a booster motor frame provided with a bearing on said axle, link means suspending said motor frame from said main frame, and a link connecting said motor frame with said truck.

24. In a locomotive, a main frame, a trailer truck partially supporting said frame and including an axle, a booster motor connected to said axle and extending therefrom, the extending portion of said motor being supported from said main frame at a single point.

25. The combination with a booster motor for locomotives, of a truck having an axle and wheels, and means articulated with the truck body for maintaining the booster motor in alignment with the axle.

26. The combination with a locomotive, of a truck movable with respect to the locomotive and having an axle and wheels, a booster motor in part supported on the truck, means for supporting the booster motor from the locomotive with freedom for lateral motion with respect thereto, and means connecting said truck and said motor at a point on the motor spaced from said axle for moving said motor with said truck.

In testimony whereof I hereunto affix my signature this 2nd day of June, 1924.

H. M. PFLAGER.